March 4, 1969 D. P. GREGG 3,430,966

TRANSPARENT RECORDING DISC

Filed April 3, 1967

INVENTOR:
DAVID PAUL GREGG

By Keith D. Beecher

ATTORNEY

United States Patent Office 3,430,966

Patented Mar. 4, 1969

3,430,966

TRANSPARENT RECORDING DISC

David Paul Gregg, Los Angeles, Calif., assignor, by mesne assignments, to Gauss Electrophysics, Inc., Santa Monica, Calif., a corporation of California Filed Apr. 3, 1967, Ser. No. 627,701

U.S. Cl. 274—42 3 Claims

Int. Cl. G01d 15/34

ABSTRACT OF THE DISCLOSURE

The invention is particularly concerned with an improved disc-type record for optical recordings, and with a turntable assembly which is particularly adapted to drive such a record. The record is a transparent plastic and the recordings are formed in spiral grooves as opaque coatings.

*Related applications*

Copending application Ser. No. 507,474, filed Nov. 12, 1965, in the name of Keith Johnson and David Paul Gregg, describes and claims an improved transducer head and associated control system for reproducing signals from a rotating record disc on which video signals are optically recorded.

As described in the copending application, the transparent record disc is rotated on an appropriatae turntable, and a light is directed from a light source through the disc. A transducer head is mounted on the other side of the disc in alignment with the light source, and both the source and the transducer are moved from the periphery of the disc towards its center as the disc is rotated.

The video signals are recorded in a spiral track on the record disc described in the copending application by means of a modulated electromagnetic beam, such as an electron beam or laser ray, and this track is sensed by the transducer head during the reproduction operation. The recording track may have a width, for example, of the order of one micrometer, and the spacing between adjacent convolutions of the track may also be of the order of one micrometer.

*Summary of the invention*

The present invention provides an improved record disc having signals optically recorded thereon, and which is particularly adapted for use in conjunction with the transducer head and system described in the aforesaid copending application. An object of the invention is to provide an improved construction for the aforesaid record disc; by which the recordings thereon are protected, so that even under ordinary rough usage of the disc, they are not impaired.

A further object of the invention is to provide such an improved record disc which is constructed to be rotatably driven by a turntable of small diameter with respect to the disc, so that light from the light source may be directed unimpeded through the disc along the spiral track from its outer periphery to its center, for modulation by the recorded spiral on the disc. Another object is to provide an improved turntable assembly for rotatably driving the aforementioned record disc.

*Description of preferred embodiments*

Figure 1:
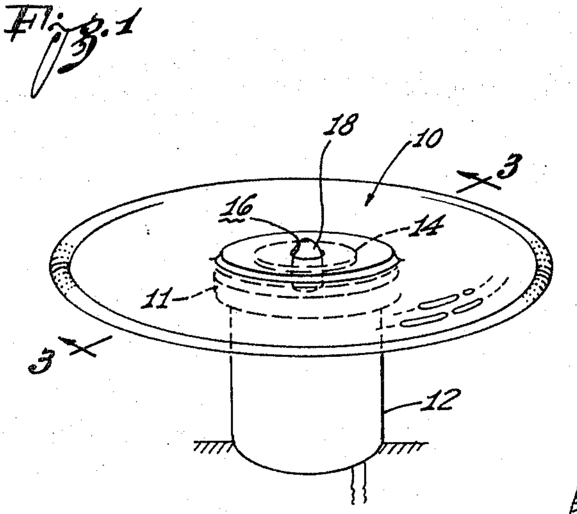
FIGURE 1 is a perspective view showing a transparent record disc of the type with which the present invention is concerned, the record disc having signals optically recorded thereon and being mounted on an appropriate rotatable drive means.

As illustrated in FIGURE 1, the transparent record disc 10, which is constructed in accordance with the concepts of the present invention, is rotatably driven by a turntable 11 which, in turn, is driven by a motor 12.

Figure 2:
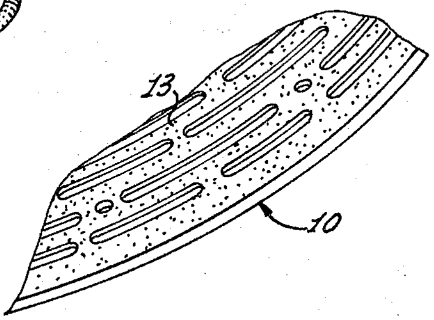
FIGURE 2 is a fragmentary plan view of the record disc of FIGURE 1, showing the manner in which the signals are optically recorded on the disc.

As shown more clearly in FIGURE 2, a metallic deposit 13 is formed on the record disc 10. The metallic deposit interrupts the transparency of the disc in a particular pattern, so that a spiral optical recording track is formed on the disc. The recording track extends from the periphery of the record disc to its center, and signals are recorded in the spiral track in an optical manner.

When the record disc 10 is rotated by the turntable 11, and as described in detail in the copending application, a light source is moved under the disc in axial alignment with a transducer head, the latter being moved over the disc. The relationship between the light source and transducer head is such that the light from the light source passes through the optical recordings on the spiral track to be modulated thereby. The transducer head responds to the resulting modulated light beam to convert the same into corresponding video, or other signals, as described in the copending application.

It will be appreciated that it is important for the record disc 10 to be securely supported on the turntable 11. At the same time, the diameter of the turntable 11 must be small relative to the diameter of the disc, so that the light source may move unimpeded along the spiral track under the disc, and so that its beam may be directed up through the disc.

Figure 3:
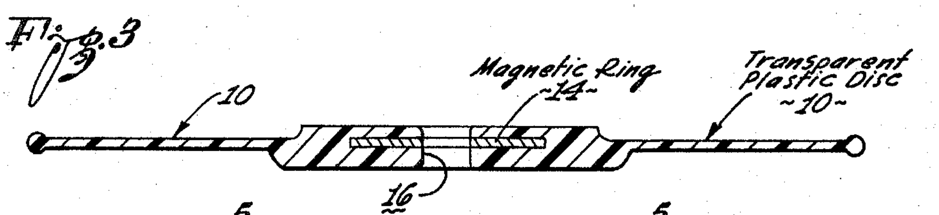
FIGURE 3 is a cross section of the record disc, taken substantially along the line 3—3 of FIGURE 1.

As shown in FIGURE 3, the record disc 10 is composed, for example, of a transparent plastic material. Also, an annular member 14 composed, for example, of a ferromagnetic material of high coercive force is embedded in the center of the disc. The annular member 14 is positioned concentrically with the center of the disc so as to be in axial alignment with the turntable 11, when the disc is supported on the turntable.

Figures 4, 5, 6, 7:
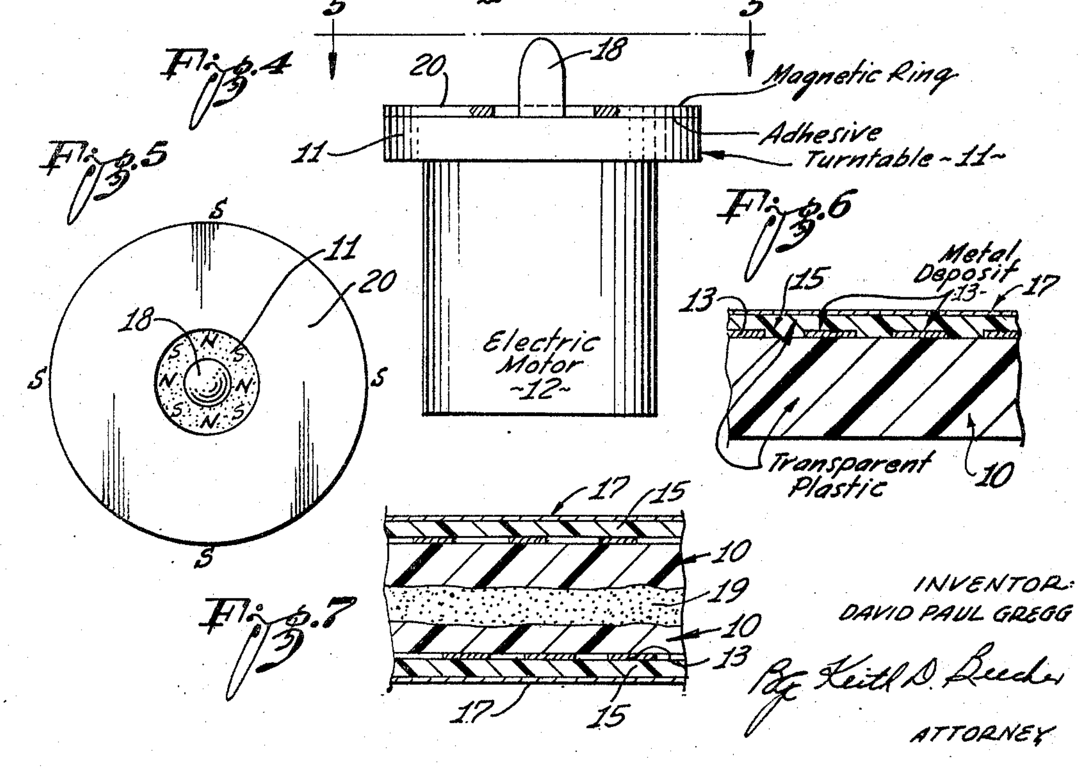
FIGURE 4 is a side elevational view of a rotatable drive assembly for the disc.
FIGURE 5 is a plan view of the rotatable drive assembly taken substantially along the line 5—5 of FIGURE 4.
FIGURE 6 is a fragmentary section of the record disc, on an enlarged scale.
FIGURE 7 is a fragmentary section of the modified form of the record disc.

The disc has a central aperture 16 which receives the usual central post 18 of the turntable. As shown in FIGURE 5, the turntable also includes an annular member 20 which is composed of magnetic material, and which may exhibit north and south poles as shown in FIGURE 5. The relationship between the members 14 and 20 is such that a magnetic attraction is established so as to support the record disc 10 securely yet releasably, on the turntable 11.

As shown in the fragmentary section of FIGURE 6, the metallic deposit 13 is disposed down below the surface of the disc 10, so that the recordings represented thereby may be protected under normal rough usage of the disc.

The deposit 13 may be formed on the disc 10 in a variety of manners, and by using a variety of processes. For example, the disc may first be embossed from a properly prepared master recording disc with inverted grooves, or a copy thereof, so that a spiral track on at least one surface of the disc 10 has channels and depressions corresponding to the recordings, shown, for example, in FIGURE 2. This may be achieved, for example, by placing disc-shaped transparent plastic blanks between a base die and an embossing die, and by thereby producing a plurality of embossed discs, on a mass production basis.

Each of the embossed discs has grooves and channels therein extending along a spiral track and corresponding to the signals to be recorded. Each disc may then be treated by a further process, whereby the deposit 13 may be placed on the disc by vacuum deposition means. This may be achieved, for example, by placing each embossed disc on a turntable, and by then vacuum evaporating the deposits 13 by known techniques from an angle onto the surface of the disc. This angular evaporation of the deposit 13 causes it to form on the surface of the disc yet not in the bottoms of the grooves and channels. The net result is that the surface of the disc is rendered opaque by the metallic deposit and yet the grooves and channels themselves remain transparent.

Then, a layer of transparent plastic 15, of the same index of refraction as the disc, may be caused to flow over the surface of the disc, so as to cover the metal deposit 13 and to fill the transparent grooves and depressions in the surface of the disc. This latter layer forms a protection for the metallic deposit, so that it cannot become corroded by handling, or the like, and to prevent it from becoming impaired by normal rough usage of the disc.

A further thin transparent layer 17 of a transparent carbon, or other conductive material, may be deposited over the top and bottom of the disc, which serves to inhibit any electrostatic charges on the disc which might attract dust.

Although the recording medium of the present invention has been described in conjunction with the recording of video signals, it is apparent that audio or other signals may be recorded on the disc, if so desired.

For video applications, the disc may be rotated, for example, at speeds of the order of 1800 or 3600 r.p.m. This causes the groove to move at tangential speeds relative to the reproducing transducer, of the order of 14–20 meters per second, which with a minimum bit diameter of one micrometer, provides a bandwidth of at least 14 megabits or 7 megahertz, which is adequate for the reproduction of black-and-white or color television recordings.

To permit playing of both sides of the disc, the construction of FIGURE 7 is followed, but with the addition of a layer 19, which may be a stratum of diffusing material. This diffusing material may consist of translucent, china-filled, or similar plastic material; a beaded lenticularly surfaced plastic of diffraction index other than the disc matrix material; or balls of the latter material evenly dispersed.

In the case of the two-sided playing disc, the light source and reproducing transducer combination may be interchanged relative to the disc, either by turning over the transducer or by turning over the disc.

In order to prevent the modulation of the light source by the recorded information on the side nearest the light source, the optical lenses of the light source are constructed so as to produce a cone of light rays converging on the bottom side of the recorded information nearest the reproducing transducer. In this manner, many bits of information are encompassed on the side nearest the light source, none are resolved, and the light intensity reaching the side to be reproduced is diminished only by an average amount equal to a large area of the lighted side, taken as a whole, together with the light attenuation provided by the diffusing layer.

What is claimed is:

1. In combination: a disc-like record formed of a transparent material; optical recordings representative of video signals formed on at least one side of said record member in the form of an intermittent opaque deposit extending in a spiral recording track on said record from the periphery thereof towards the center thereof and terminating a certain distance from the center of said record, said opaque deposit selectively interrupting the transparency of said transparent material along said track; a turntable member for supporting said disc-like record having a diameter corresponding to the distance between the center of said record and the termination of said recording track so that the part of said record containing said recording track extends over the peripheral edge of said turntable; a layer of conductive transparent material extending over said surface of said disc to inhibit electrostatic charges thereon; and magnetic means mounted in each of the aforesaid members to enable said disc-like record to be firmly yet releasably supported on said turntable.

2. The combination defined in claim 1 in which said magnetic means comprises a permanent magnet mounted in one of the aforesaid members and a magnetizable member mounted in the other of the aforesaid members.

3. The combination defined in claim 1 in which said disc-like record includes a layer of transparent plastic material of the same index of refraction as said transparent material of said record and formed over said surface to cover said surface and protect said opaque deposit.

References Cited

UNITED STATES PATENTS

| | | | |
|---|---|---|---|
| 1,956,626 | 5/1934 | Robbins | 274—41.6 |
| 2,997,451 | 8/1961 | Miller | 274—42 X |
| 1,951,198 | 3/1934 | Mittell et al. | 274—46 |
| 2,020,861 | 11/1935 | Willigen et al. | 274—41.6 |
| 2,040,693 | 5/1936 | Huguenard | 274—46 |
| 2,086,934 | 7/1937 | Bonneau | 274—46 X |
| 2,283,797 | 5/1942 | Dech | 274—42 |
| 2,806,704 | 9/1957 | Burdett | 274—42 |
| 2,993,234 | 7/1961 | Miura et al. | 264—107 |

RICHARD B. WILKINSON, *Primary Examiner.*

JOSEPH W. HARTARY, *Assistant Examiner.*

U.S. Cl. X.R.

346—137; 178—6.7; 179—100.4